US006904215B2

(12) United States Patent
Christoff et al.

(10) Patent No.: US 6,904,215 B2
(45) Date of Patent: Jun. 7, 2005

(54) LOW MACROBENDING LOSS OPTICAL FIBER

(75) Inventors: William R. Christoff, Elmira, NY (US); Kristina M. Jeric, Wilmington, NC (US); David T. Marlowe, Wilmington, NC (US); Snigdharaj K. Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 61 days.

(21) Appl. No.: 10/444,180

(22) Filed: May 23, 2003

(65) Prior Publication Data

US 2003/0223716 A1 Dec. 4, 2003

Related U.S. Application Data

(60) Provisional application No. 60/384,625, filed on May 31, 2002.

(51) Int. Cl.[7] .................................................. G02B 6/18
(52) U.S. Cl. ...................................................... 385/124
(58) Field of Search ................................... 385/123–128

(56) References Cited

U.S. PATENT DOCUMENTS

| | | | |
|---|---|---|---|
| 3,823,997 A | | 7/1974 | Gloge et al. |
| 3,904,268 A | | 9/1975 | Keck et al. |
| 4,412,722 A | | 11/1983 | Carnevale et al. |
| 5,644,670 A | | 7/1997 | Fukuda et al. |
| 6,266,467 B1 | * | 7/2001 | Kato et al. .................. 385/123 |
| 6,563,989 B2 | * | 5/2003 | Ishikawa et al. .............. 385/43 |
| 6,771,865 B2 | * | 8/2004 | Blaszyk et al. ............. 385/127 |
| 2001/0021298 A1 | | 9/2001 | Mukasa | 
| 2004/0033039 A1 | * | 2/2004 | Oliveti et al. ................ 385/123 |

FOREIGN PATENT DOCUMENTS

| | | | |
|---|---|---|---|
| WO | WO 99/36816 | 7/1999 | |
| WO | WO01/11409 A2 | 2/2001 | |
| WO | WO-02021731 A3 * | 3/2002 | ............ G02B/6/18 |

OTHER PUBLICATIONS

XP–002090721; Morishita, Katsumi, et al; Compensation of Intermodal Dispersion by Splicing Two Graded–Index Multimode Fibers; May 1982; pp. 694–700.
XP–002272910; Sakai, Jun–ichi, et al; Bending Loss of Propagation Modes in Arbitrary–Index Profile Optical Fibers; May 15, 1978; pp. 1499–1506.
Jang et al., "Fundamental Mode Size and Bend Sensitivity of Graded and Step–Index Single–Mode Fibers with Zero–Dispersion Near 1.55 $\mu$m," Journal of Lightwave Technology, vol. LT–2, No. 3, Jun. 1984, pp. 312–316.

* cited by examiner

*Primary Examiner*—Akm Enayet Ullah
*Assistant Examiner*—Omar Rojas
(74) *Attorney, Agent, or Firm*—Svetlana Z. Short

(57) ABSTRACT

The present invention provides an optical fiber suitable for the manufacture of optical fiber couplers and having low macrobending loss, low cutoff wavelength, low attenuation, and low sensitivity to variations in overclad mass. One aspect of the present invention provides an optical fiber having a core having an index profile, the index profile of the core having a value of $\alpha$ of between about 1.7 and about 3.0; and a cladding region surrounding and in contact with the core, the cladding region having an outer radius of at least about 40 $\mu$m, wherein the optical fiber has a cutoff wavelength of between about 870 nm and about 970 nm, and a macrobending loss of below about 1 dB at a wavelength of 1550 nm when wrapped one turn around a 32 mm mandrel.

14 Claims, 2 Drawing Sheets

LOW MACROBENDING LOSS OPTICAL FIBER

CROSS-REFERENCE TO RELATED APPLICATIONS

The present application claims the priority under 35 U.S.C. §119 (e) of U.S. Provisional Patent Application Ser. No. 60/384,625, filed May 31, 2002, which is entitled "LOW MACROBENDING LOSS OPTICAL FIBER" and is hereby incorporated by reference herein.

BACKGROUND OF THE INVENTION

1. Field of the Invention

The present invention relates generally to optical communications, and more specifically to optical fibers having low macrobending loss suitable for splicing and for the fabrication of optical fiber couplers.

2. Technical Background

A high performance optical telecommunication system carries high data rates over long distances with no electronic regeneration. For example, rates of 10 Gb/s or more over unregenerated distances of three to five hundred kilometers have been achieved. A high performance system may employ high power signal lasers, optical amplifiers, dispersion compensation devices, optical switching devices, and may use wavelength division multiplexing. Optical telecommunications systems are progressing toward higher speeds and longer span lengths, making the requirements for system components more and more arduous.

One such system component is an optical fiber coupler. Optical fiber couplers provide for coupling of optical signals between optical fibers, and are ubiquitous in the devices used in optical telecommunications systems. Optical fiber couplers may be made, for example, by heating and stretching a pair of coextending optical fibers to fuse and taper them. An optical signal traveling in one of the optical fibers is evanescently coupled into the other optical fiber in the fused region. Optical fiber couplers are used in a variety of devices to split and combine optical signals. For example, optical coupler may be used to divide optical power between two paths with a desired ratio (e.g. 1:1, 9:1). An optical fiber coupler may also be used as a WDM to combine optical pump radiation with an optical signal in an erbium-doped fiber amplifier.

As the requirements for the optical performance of optical fiber couplers become ever more stringent, the need to eliminate sources of optical loss becomes critical. One such source is loss due to macrobending in the unfused regions of the optical fibers. Optical fiber couplers are generally made to have relatively long (e.g. 2–5 m) lengths of optical fiber leading from the coupling region. When an optical fiber coupler is assembled in a device, these optical fiber leads are often bent with a small radius or coiled around a spool. This type of bending is known as macrobending, to distinguish it from microbending due to microscopic distortions of an otherwise straight fiber. Conventional optical fibers tend to have relatively high macrobending losses, giving the assembled device an unacceptably high loss.

While there exist optical fibers having low macrobending loss, many of these fibers suffer from relatively high variability in manufacture. In these optical fibers, the profile may be such that the optical properties of the fiber vary widely with variations in the mass of its overclad layer. Optical fibers that are relatively insensitive to minor variations in overclad thickness are highly desirable.

A WDM coupler is an optical fiber coupler device that combines or separates light having two different wavelengths (e.g. 980 nm and 1550 nm). For use in the fabrication of devices such as WDM couplers, optical fibers having low cutoff wavelengths are highly desirable. In general, macrobending loss at a wavelength of 1550 nm increases with decreasing cutoff wavelength, making it difficult to provide a fiber having both low macrobending loss and low cutoff wavelength.

Conventional optical fibers do not provide for the manufacture of optical fiber couplers with the desired performance. There remains a need for an optical fiber that exhibits low macrobending loss while also having low cutoff wavelength, low splice loss, low attenuation, and the ability to be fabricated into a low-loss optical fiber coupler. From the cost and process point of view, ease of manufacture and insensitivity of optical fiber properties to process variations are also highly desirable properties.

DEFINITIONS

The following definitions are in accord with common usage in the art.

The refractive index profile is the relationship between refractive index and optical fiber radius.

Delta, $\Delta$, is the relative refractive index percent, $\Delta=(n_i^2-n_c^2)/2n_c^2$, where $n_i$ is the specified refractive index in region i, and $n_c$ is the average refractive index of the cladding region. Deltas are conventionally expressed as percents.

The term $\alpha$-profile refers to a refractive index profile, expressed in terms of $\Delta(b)$, where b is radius, which follows the equation $$\Delta(b)=\Delta(b_0)(1-[|b-b_0|/(b_1-b_0)]^\alpha)$$

where $b_0$ is the point at which $\Delta(b)$ is maximum, $b_1$ is the point at which $\Delta(b)\%$ is zero, and b includes values in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number. For a given profile, the $\alpha$ may be determined by a numerical fit of profile data to the above equation.

Cutoff wavelength is the longest wavelength of light for which an optical fiber supports two core-guided modes.

SUMMARY OF THE INVENTION

One aspect of the present invention relates to an optical fiber including a core having an index profile, the index profile of the core having a value of $\alpha$ of between about 1.7 and about 3.0; and a cladding region surrounding and in contact with the core, the cladding region having an outer radius of at least about 40 $\mu$m, wherein the optical fiber has a cutoff wavelength of between about 870 nm and about 970 nm, and a macrobending loss of below about 1 dB at a wavelength of 1550 nm when wrapped one turn around a 32 mm mandrel.

Another aspect of the present invention relates to an optical fiber including a core having an index profile, the index profile of the core having a value of $\alpha$ of between about 1.7 and about 3.0 and a maximum value of $\Delta$ of between about 0.4% and about 0.7%; and a cladding region surrounding and in contact with the core, the cladding region having an outer radius of at least about 40 $\mu$m, the cladding region having a substantially flat index profile, wherein the optical fiber has a bend loss of below about 1 dB at a wavelength of 1550 nm when wrapped one turn around a 32 mm mandrel.

The optical fibers of the present invention result in a number of advantages over prior art optical fibers. For example, the optical fibers of the present invention have both low macrobending losses and low cutoff wavelengths, and are suitable for the production of optical fiber couplers with low coupling loss. The optical fibers of the present invention also have low attenuation. The optical fibers of the present invention are also relatively insensitive to overclad mass, making them manufacturable in high yield. Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale. The drawings illustrate one or more embodiment(s) of the invention, and together with the description serve to explain the principles and operation of the invention.

DETAILED DESCRIPTION OF THE PREFERRED EMBODIMENTS

Figure 1:
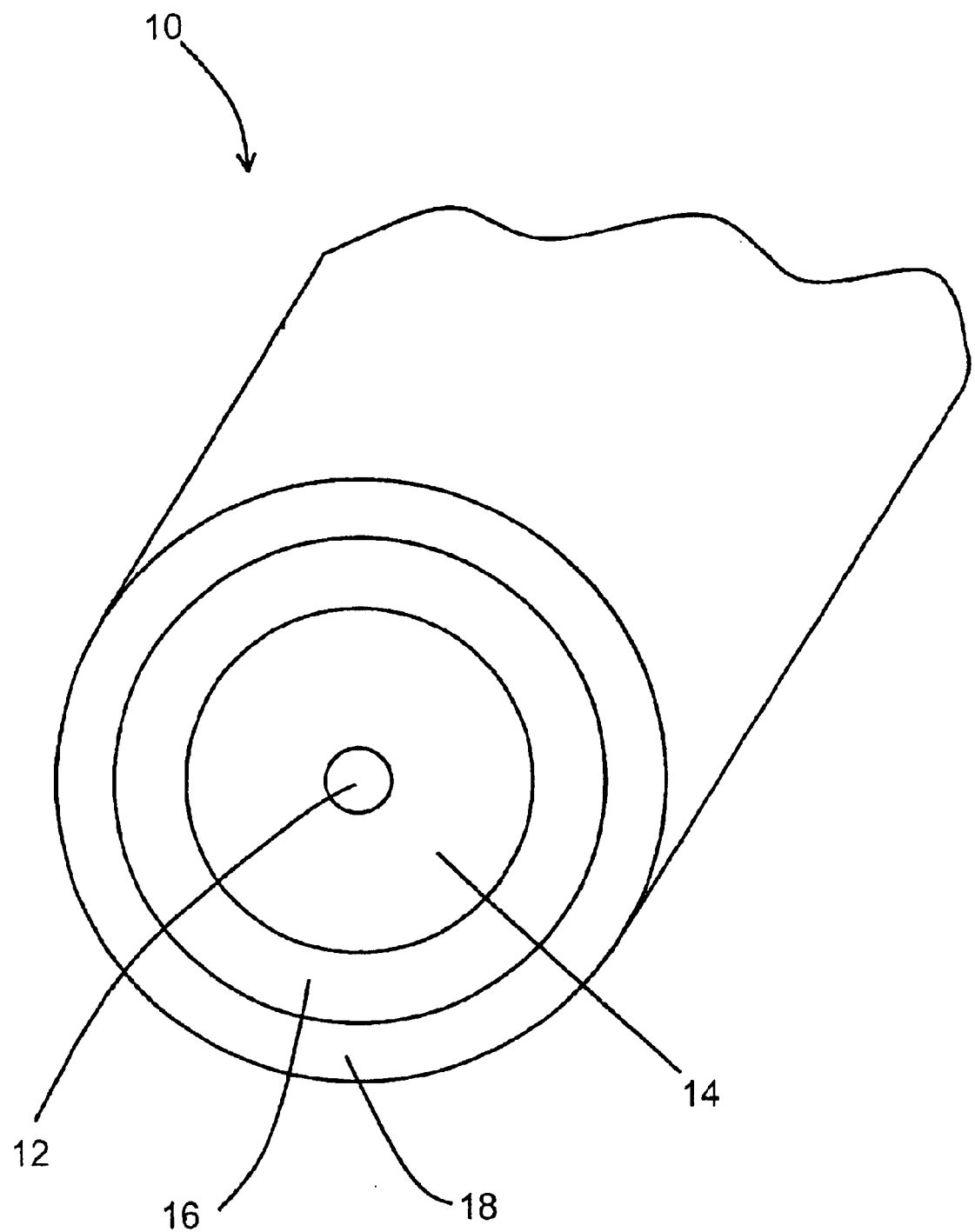
FIG. 1 is an end view of an optical fiber according to one aspect of the present invention.

The invention disclosed and described herein relates to an optical fiber suitable for the manufacture of optical fiber couplers while having a low macrobending loss, low cutoff wavelength, low attenuation, and a profile that is fairly insensitive to overclad mass. FIG. 1 shows a schematic end view of an exemplary optical fiber according to one aspect of the present invention. The optical fiber 10 has a core 12 and a cladding region 14 surrounding the core and in substantial contact with the core. Preferably, cladding region 14 has an outer radius of at least about 40 $\mu$m. Preferably, the cladding region has a substantially flat index profile. The example of FIG. 1 has one substantially uniform cladding region surrounding the core. The skilled artisan will realize, however, that the present invention includes optical fibers having other cladding regions surrounding the cladding region shown in FIG. 1. As is customary, the fiber may be coated with layers of polymer coatings 16 and 18.

Figure 2:
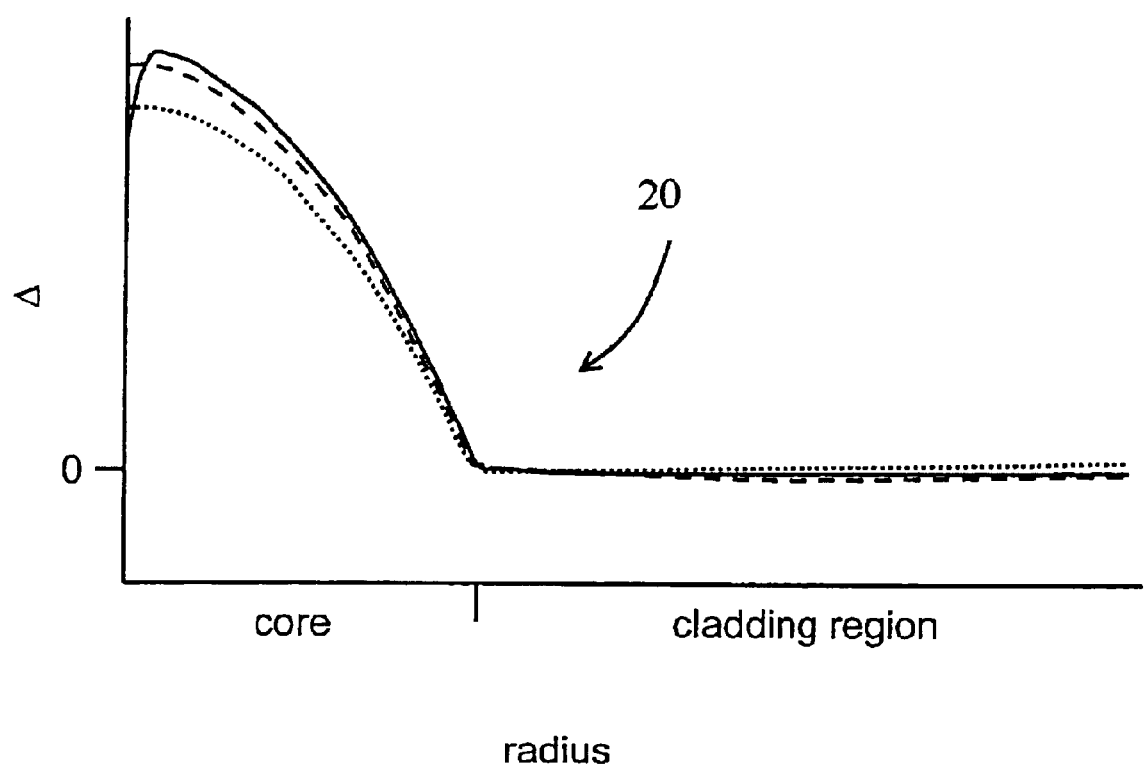
FIG. 2 is a graph showing refractive index profiles of examples of optical fibers according to one aspect of the present invention.

Examples of profiles of optical fibers according to one aspect of the present invention are given in FIG. 2 as plots of $\Delta$ vs. radius. In the examples of FIG. 2, the core has an $\alpha$ of between about 1.7 and about 3.0. While it is preferable that the $\alpha$-profile begin at the center of the core, the skilled artisan will recognize that the $\alpha$-profile need not begin at the center of the core. For example, as shown in fiber profile 20, there may be an index depression along the center of the core, with the $\alpha$-profile beginning near the maximum $\Delta$ of the core. In more preferred embodiments of the present invention, the core has an $\alpha$ of between about 1.9 and about 2.3.

In optical fibers according to one aspect of the present invention, the core has a maximum $\Delta$ of between about 0.4% and about 0.7%. Especially desirable optical fibers of the present invention have cores having a maximum $\Delta$ of between about 0.5% and about 0.6%. Optical fibers of the present invention may have cores having outer radii of between about 3.2 $\mu$m and about 4.2 $\mu$m. The outer radius of the core is defined as the point of substantially discontinuous refractive index between the core and the cladding region. In many optical fibers of the present invention, the profile of the core will approach a $\Delta$ of about 0 as its outer radius.

Optical fibers of the present invention may be fabricated to have a mode field diameter at a wavelength of 1060 nm of between about 5.7 $\mu$m and about 6.7 $\mu$m. More preferred optical fibers of the present invention have a mode field diameter at a wavelength of 1060 nm of between about 6.0 $\mu$m and about 6.4 $\mu$m.

Optical fibers of the present invention have both low macrobending losses and low cutoff wavelengths, and are therefore highly desirable for use in WDM couplers. For example, optical fibers of the present invention have macrobending losses of less than about 1 dB at a wavelength of 1550 nm when wrapped one turn around a 32 mm mandrel. Optical fibers of the present invention may be fabricated to have cutoff wavelengths of between about 870 nm and about 970 nm. More preferred optical fibers of the present invention have cutoff wavelengths of between about 920 nm and about 940 nm. MAC# is another useful measure of macrobending loss. The MAC# at a given wavelength is the ratio of the mode field diameter of the fiber for light of the given wavelength to the single mode cutoff wavelength of the fiber. Optical fibers of the present invention may have, for example, a MAC# at 1060 nm of less than about 6.9, or a MAC# at 1550 nm of less than about 10.1.

The optical fibers of the present invention are fairly insensitive to variations in processing. For example, the profiles of the optical fibers are not highly sensitive to variations in overclad mass. As such, a single core can be repeatably overclad and drawn to yield optical fibers having relatively constant properties. The robustness of a profile to variations in overclad mass may be quantified by its dispersion sensitivity parameter. The dispersion sensitivity parameter is calculated by computing the change in dispersion due to a 2% increase in the radial scale of the profile. Profiles with smaller dispersion sensitivity parameters are less sensitive to changes in overclad weight, and are manufacturable in higher yields. The optical fibers of the present invention may have dispersion sensitivity parameters of below about 0.65 ps/nm-km. More preferable optical fibers of the present invention have sensitivity parameters of below about 0.50 ps/nm-km.

Preferably, the optical fibers disclosed herein are made by a vapor deposition process. Even more preferably, the optical fibers disclosed herein are made by outside vapor deposition (OVD) processes familiar to the skilled artisan. Thus, for example, known OVD laydown, consolidation and draw techniques may be advantageously used to produce the optical fibers of the present invention. Other processes, such as modified chemical vapor deposition (MCVD) or vapor axial deposition (VAD) may be used. Thus, the refractive index and compositional profiles of the optical fibers disclosed herein may be accomplished using manufacturing techniques known to those skilled in the art including, but in no way limited to, OVD, VAD and MCVD processes. As will be appreciated by the skilled artisan, the optical fibers of the present invention may be coated with polymeric materials. For example, the fiber may be coated with a low modulus acrylate-based primary coating, and a high modulus acrylate-based secondary coating for physical protection of the fiber as well as for reduction of attenuation due to microbending. Optical performance of a given profile may be calculated by solving Maxwell's Equations using methods familiar to the skilled artisan.

The optical fibers of the present invention may also be fabricated by the skilled artisan to have other desirable properties. For example, inventive optical fibers may be fabricated to have attenuations of less than about 2.1 dB/km at 980 nm, less than about 1.5 dB/km at 1060 nm, and less than about 0.75 dB/km at 1550 nm. More preferably, optical fibers of the present invention have attenuations of less than about 1.4 dB/km at 980 nm, less than about 1.0 at 1060 nm, and less than about 0.5 dB/km at 1550 nm. The skilled artisan will adjust the physical properties of the optical fiber within the ranges of this invention in order to yield an optical fiber with other desired properties.

The invention will now be illustrated by the following non-limiting example.

EXAMPLE 1

Conventional OVD processes were used to fabricate an optical fiber having the following profile:

α=2.10, with the α-profile beginning at the center of the core core radius=3.6 μm

Δ=0.54%.

The optical fiber had the following properties:

cutoff wavelength: 932 nm mode field diameter: 6.2 mm at 1060 nm; 9.1 mm at 1550 nm MAC#: 6.6 at 1060 nm Macrobending loss (single turn, 32 mm mandrel): 0.65 dB Attenuation: 1.09 dB/km at 980 nm; 0.79 dB/km at 1060 nm; 0.25 dB/km at 1550 nm Dispersion: 5.5 ps/nm-km at 1530 nm; 6.7 ps/nm-km at 1550 nm Dispersion sensitivity parameter: 0.47 ps/nm-km.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical fiber comprising
   a core having an index profile, the index profile of the core having a value of α of between about 1.7 and about 3.0; and
   a cladding region surrounding and in contact with the core, the cladding region having an outer radius of at least about 40 μm.
   wherein the optical fiber has a cutoff wavelength of between about 870 nm and about 970 nm, and a macrabending loss of below about 1 dB at a wavelength of 1550 nm when wrapped one turn around a 32 mm mandrel, wherein the optical fiber has a mode field diameter at a wavelength of 1060 nm of between about 5.7 μm and about 6.7 μm.

2. The optical fiber of claim 1 wherein the cladding region has a substantially flat index profile.

3. The optical fiber of claim 1 wherein the core has a maximum value of Δ of between about 0.4% and about 0.7%

4. The optical fiber of claim 1 wherein the value of α is between about 1.9 and about 2.3.

5. The optical fiber of claim 1 wherein the optical fiber has a mode field diameter at a wavelength of 1060 nm of between about 6.0 μm and about 6.4 μm.

6. The optical fiber according to claim 1 wherein,
   the core has a maximum value of Δ of between about 0.4% and about 0.7%; and
   the cladding region has a substantially flat index profile.

7. The optical fiber of claim 1 wherein the optical fiber has a cutoff wavelength of between about 920 nm and about 940 nm.

8. The optical fiber of claim 1 wherein the index profile of the core has a dispersion sensitivity of less than about 0.65 ps/nm-km.

9. The optical fiber of claim 1 wherein the index profile of the core has a dispersion sensitivity of less than about 0.5 ps/nm-km.

10. An optical fiber comprising
    a core having an index profile, the index profile of the core having a value of α of between about 1.7 and about 3.0; and
    a cladding region surrounding and in contact with the core, the cladding region having an outer radius of at least about 40 μm.
    wherein the optical fiber has a cutoff wavelength of between about 870 μm and about 970 nm, and a macrobending loss of below about 1 dB at a wavelength of 1550 nm when wrapped one turn around a 32 mm mandrel, wherein the core has an outer radius of between about 3.2 μm and about 4.2 μm.

11. An optical fiber comprising
    a core having an index profile, the index profile of the core having a value of α of between about 1.7 and about 3.0; and
    a cladding region surrounding and in contact with the core, the cladding region having an outer radius of at least about 40 μm.
    wherein the optical fiber has a cutoff wavelength of between about 870 nm and about 970 nm, and a macrobending loss of below about 1 dB at a wavelength of 1550 nm when wrapped one turn around a 32 mm mandrel, said optical fiber having a ratio of mode field diameter at 1060 nm to cutoff wavelength of less than about 6.9.

12. An optical fiber comprising
    a core having an index profile, the index profile of the core having a value of α of between about 1.7 and about 3.0; and
    a cladding region surrounding and in contact with the core, the cladding region having an outer radius of at least about 40 μm.
    wherein the optical fiber has a cutoff wavelength of between about 870 nm and about 970 nm, and a macrobending loss of below about 1 dB at a wavelength of 1550 nm when wrapped one turn around a 32 mm mandrel, said optical fiber having a ratio of mode field diameter at 1550 nm to cutoff wavelength of less than about 10.1.

13. An optical fiber comprising
    a core having an index profile, the index profile of the core having a value of α of between about 1.7 and about 3.0; and
    a cladding region surrounding and in contact with the core, the cladding region having an outer radius of at least about 40 μm.
    wherein the optical fiber has a cutoff wavelength of between about 870 nm and about 970 nm, and a macrobending loss of below about 1 dB at a wavelength of 1550 nm when wrapped one turn around a 32 mm mandrel, wherein the index profile of the core has a dispersion sensitivity of less than about 0.65 ps/nm-km.

14. The optical fiber of claim 13 wherein the index profile of the core has a dispersion sensitivity of less than about 0.5 ps/nm-km.

* * * * *